(12) United States Patent
Kang et al.

(10) Patent No.: US 12,371,770 B2
(45) Date of Patent: Jul. 29, 2025

(54) HIGH-STRENGTH HOT-DIP GALVANIZED STEEL SHEET HAVING EXCELLENT SURFACE QUALITY AND ELECTRIC RESISTANCE SPOT WELDABILITY, AND MANUFACTURING METHOD THEREFOR

(71) Applicant: POSCO Co., Ltd, Pohang-si (KR)

(72) Inventors: Ki-Cheol Kang, Gwangyang-si (KR); Tae-Chul Kim, Gwangyang-si (KR); Myung-Soo Kim, Gwangyang-si (KR); Jong-Sang Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 28 days.

(21) Appl. No.: 18/267,029

(22) PCT Filed: Dec. 17, 2021

(86) PCT No.: PCT/KR2021/019311
§ 371 (c)(1),
(2) Date: Jun. 13, 2023

(87) PCT Pub. No.: WO2022/131863
PCT Pub. Date: Jun. 23, 2022

(65) Prior Publication Data
US 2024/0043953 A1    Feb. 8, 2024

(30) Foreign Application Priority Data
Dec. 18, 2020   (KR) ................. 10-2020-0179087

(51) Int. Cl.
| | |
|---|---|
| *C23C 2/02* | (2006.01) |
| *B32B 15/01* | (2006.01) |
| *C21D 1/18* | (2006.01) |
| *C21D 1/74* | (2006.01) |
| *C21D 6/00* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/22* | (2006.01) |
| *C22C 38/26* | (2006.01) |
| *C22C 38/28* | (2006.01) |

(Continued)

(52) U.S. Cl.
CPC ............ *C23C 2/024* (2022.08); *B32B 15/013* (2013.01); *C21D 1/18* (2013.01); *C21D 1/74* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C21D 8/0278* (2013.01); *C21D 8/0294* (2013.01); *C21D 9/46* (2013.01); *C22C 38/002* (2013.01); *C22C 38/008* (2013.01); *C22C 38/02* (2013.01); *C22C 38/04* (2013.01); *C22C 38/06* (2013.01); *C22C 38/14* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/60* (2013.01); *C23C 2/02* (2013.01); *C23C 2/0224* (2022.08); *C23C 2/06* (2013.01); *C23C 2/28* (2013.01); *C21D 2221/02* (2013.01)

(58) Field of Classification Search
CPC ....... B32B 15/013; C23C 2/06; C22C 38/002; C22C 38/008; C22C 38/02; C22C 38/04; C22C 38/06; C22C 38/22; C22C 38/26; C22C 38/28; C22C 38/32; C22C 38/34; C22C 38/38
USPC .......................................... 428/659
See application file for complete search history.

(56) References Cited

U.S. PATENT DOCUMENTS

| | | |
|---|---|---|
| 2012/0152411 A1 | 6/2012 | Morimoto et al. |
| 2014/0234657 A1 | 8/2014 | Azuma et al. |

(Continued)

FOREIGN PATENT DOCUMENTS

| | | |
|---|---|---|
| JP | 2008-248358 A | 10/2008 |
| JP | 4943558 B2 | 3/2012 |

(Continued)

OTHER PUBLICATIONS

International Search Report dated Apr. 6, 2022, issued in International Patent Application No. PCT/KR2021/019311 (with English translation).

(Continued)

*Primary Examiner* — Katherine A Christy
(74) *Attorney, Agent, or Firm* — Morgan Lewis & Bockius LLP

(57) ABSTRACT

A hot-dip galvanized steel sheet according to one aspect of the present invention comprises a base steel sheet and a hot-dip galvanized layer formed on the surface of the base steel sheet, wherein the difference between the average of the Mn/Si values of surface oxides present on a surface portion, which is the region from the interface between the hot-dip galvanized layer and the base steel sheet to a depth of 15 nm, and the average of the Mn/Si values of internal oxides, which are present in the region from the interface to a depth of 50-100 nm, can be 0.5 or more. Mn and Si of each oxide mean the amounts (wt %) of Mn and Si components in the oxide, which are measured by EDS, and the average of Mn/Si values means the averaged value of the Mn/Si values measured for each oxide.

7 Claims, No Drawings

(51) Int. Cl.
    *C22C 38/32*   (2006.01)
    *C22C 38/34*   (2006.01)
    *C22C 38/38*   (2006.01)
    *C22C 38/60*   (2006.01)
    *C23C 2/06*    (2006.01)
    *C23C 2/28*    (2006.01)

(56) References Cited

U.S. PATENT DOCUMENTS

| | | |
|---|---|---|
| 2016/0222500 A1 | 8/2016 | Tanaka et al. |
| 2017/0088914 A1* | 3/2017 | Ikeda .................. C22C 38/28 |
| 2018/0010227 A1 | 1/2018 | Ikeda et al. |
| 2021/0025045 A1 | 1/2021 | Yoshitomi et al. |
| 2022/0042155 A1 | 2/2022 | Kang et al. |
| 2022/0056564 A1 | 2/2022 | Kang et al. |
| 2023/0024115 A1 | 1/2023 | Kang et al. |

FOREIGN PATENT DOCUMENTS

| | | |
|---|---|---|
| JP | 2015-54989 A | 3/2015 |
| JP | 2016-128598 A | 7/2016 |
| JP | 2020-143368 A | 9/2020 |
| JP | 2023-507960 A | 2/2023 |
| KR | 10-2014-0083819 A | 7/2014 |
| KR | 10-2015-0073315 A | 7/2015 |
| KR | 10-2019-0073200 A | 6/2019 |
| KR | 10-2020-0076772 A | 6/2020 |
| KR | 10-2020-0076796 A | 6/2020 |
| WO | 2013/047820 A1 | 4/2013 |
| WO | 2013/047836 A1 | 4/2013 |
| WO | 2020/170542 A1 | 8/2020 |

OTHER PUBLICATIONS

Office Action dated Aug. 20, 2024, issued in corresponding Japanese Patent Application No. 2023-536345 with an English translation.

Extended European Search Report dated Mar. 12, 2024 issued in European Patent Application No. 21907167.7.

* cited by examiner

HIGH-STRENGTH HOT-DIP GALVANIZED STEEL SHEET HAVING EXCELLENT SURFACE QUALITY AND ELECTRIC RESISTANCE SPOT WELDABILITY, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2021/019311, filed on Dec. 17, 2021, which in turn claims the benefit of Korean Application No. 10-2020-0179087, filed on Dec. 18, 2020, the disclosures of which applications are incorporated by reference herein.

TECHNICAL FIELD

The present disclosure relates to a high-strength hot-dip galvanized steel sheet having excellent surface quality and spot weldability, and a manufacturing method therefor.

BACKGROUND ART

Due to problems such as environmental pollution, regulations on automobile exhaust gas and fuel efficiency are being strengthened day by day. As a result, demand for reducing fuel consumption through weight reduction of automobile steel sheets is increasing, and thus, various types of high-strength steel sheets having high strength per unit thickness are being developed and released.

High-strength steel usually means steel having a strength of 490 MPa or more, but is not necessarily limited thereto, but may include transformation induced plasticity (TRIP) steel, twin induced plasticity (TWIP) steel, dual phase (DP) steel, complex phase (CP) steel, etc.

Meanwhile, automotive steel is supplied in the form of a plating steel sheet whose surface is plated to secure corrosion resistance. Thereamong, galvanized steel sheet (GI), highly corrosion-resistant plated steel sheet (ZM) or alloyed galvanized steel sheet (GA) are widely used as automobile materials because they have high corrosion resistance by using sacrificial anti-corrosive properties of zinc.

However, when the surface of the high-strength steel sheet is plated with zinc, there is a problem in that spot weldability becomes weak. That is, since the high-strength steel has high tensile strength and yield strength, the high-strength steel is highly likely to generate microcracks on the surface because it is difficult to relieve tensile stress generated during welding through plastic deformation. When welding is performed on a high-strength galvanized steel sheet, zinc with a low melting point penetrates into the microcracks in the steel sheet to cause a phenomenon known as liquid metal embrittlement (LME), resulting in a problem in that the steel plate is destroyed in a fatigue environment. This may act as a major obstacle to increasing the strength of the steel plate.

DISCLOSURE

Technical Problem

The present disclosure provides a high-strength hot-dip galvanized steel sheet with excellent surface quality and spot weldability and a method for manufacturing the same.

The subject of the present disclosure is not limited to the above. Those skilled in the art to which the present disclosure pertains will have no difficulty in understanding the additional objects of the present disclosure from the contents throughout the present specification.

Technical Solution

In an aspect in the present disclosure, a hot-dip galvanized steel sheet may include: a base steel sheet; and a hot-dip galvanized layer formed on a surface of the base steel sheet, in which a difference between an average of Mn/Si values of surface oxides present on a surface portion, which is a region from an interface between the hot-dip galvanized layer and the base steel sheet to a depth of 15 nm, and an average of Mn/Si values of internal oxides, which are present in the region from the interface to the depth of 50 to 100 nm, may be 0.5 or more.

Mn and Si of each oxide may mean amounts (wt %) of Mn and Si components in the oxide, which are measured by EDS, and the average of the Mn/Si values may mean an averaged value of the Mn/Si values measured for each oxide.

In another aspect in the present disclosure, a method for manufacturing a hot-dip galvanized steel sheet may include: providing a steel slab; reheating the slab to a temperature of 950 to 1300° C.; obtaining a steel sheet by hot rolling the reheated slab to a finish rolling start temperature of 900 to 1,150° C. and a finish rolling end temperature of 850 to 1,050° C.; coiling the steel sheet within a temperature range of 590 to 750° C.; pickling the steel sheet at a rolling speed of 180 to 250 mpm; cold rolling the steel sheet at a reduction ratio of 35 to 60%; recrystallization annealing the cold-rolled steel sheet by a process of heating the cold-rolled steel sheet under conditions of moist nitrogen containing 5 to 10 vol % of H2 as an atmospheric gas and a temperature and a dew point temperature at soaking zone being 650 to 900° C. and −10 to +30° C., respectively and cooling the cold-rolled steel sheet at a cooling rate of 5 to 30° C./s in a quenching zone; and hot-dip plating the steel sheet by immersing the steel sheet in a hot-dip plating bath at a lead in temperature of 420 to 500° C.

Advantageous Effects

As set forth above, according to the present disclosure, by controlling a difference between a Mn/Si value of surface oxides of a base steel sheet and a Mn/Si value of internal oxides to be large, it is possible to inhibit the generation of microcracks on a surface portion and significantly improve spot weldability.

BEST MODE

Terminologies used herein are to mention only a specific exemplary embodiment, and are not to limit the present disclosure. Singular forms used herein include plural forms as long as phrases do not clearly indicate an opposite meaning.

A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

All terms including technical terms and scientific terms used herein have the same meaning as the meaning generally understood by those skilled in the art to which the present disclosure pertains unless defined otherwise. Terms defined in commonly used dictionaries are additionally interpreted as having meanings consistent with related technical literature and currently disclosed content, and are not interpreted in ideal or very formal meanings unless defined.

Hereinafter, a high-strength hot-dip galvanized steel sheet having excellent plating quality according to an aspect of the present disclosure completed through the research of the present inventor will be described in detail. It should be noted that in the present disclosure, when each element is expressed as a content, the content means wt % unless otherwise specified. In addition, a ratio of crystal or structure is based on area unless otherwise specified, and the content of gas is based on volume unless otherwise specified.

The inventors of the present disclosure focused on the fact that liquid metal embrittlement (LME) generated during welding is caused by microcracks generated from a surface of a steel sheet, studied a means of inhibiting the microcracks on the surface, and found that it was necessary to appropriately control compositions of oxides, leading to the present disclosure.

In general, in the case of high-strength steel, a large amount of elements such as C, Mn, Si, Cr, Mo, and V may be included in order to secure hardenability or austenite stability of the steel. These elements serve to increase susceptibility to cracking in the steel. Therefore, microcracks easily occur in steel containing a large amount of these elements, ultimately causing liquid metal embrittlement during welding. According to the research results of the present inventors, as the difference (that is, a value obtained by subtracting the average of the Mn/Si values of the internal oxides from the average of the Mn/Si values of the surface oxides) between an average of Mn/Si values of surface oxides present on a surface portion, which is a region from a surface of a base steel sheet (interface between a plating layer and the base steel sheet in a hot-dip galvanized steel sheet) to a depth of 15 nm and an average of Mn/Si values of oxides (internal oxide) present in a region between 50 nm and 100 nm in depth increases, microcracks do not occur. Mn and Si of each oxide mean the amounts (wt %) of Mn and Si components in the oxide, which are measured by EDS, and the average of Mn/Si values means the averaged value of the Mn/Si values measured for each oxide.

Therefore, in one implementation embodiment of the present disclosure, (average of Mn/Si values of surface oxides–average of Mn/Si values of internal oxides) (hereinafter also referred to as "Mn/Si difference") is limited to 0.5 or greater. This means that the average of the Mn/Si values of the surface oxides is at least 0.5 greater than the average of the Mn/Si values of the internal oxides, and that the content of Mn in the surface oxides is higher than that of Si. By controlling the compositions of the oxides in this manner, the hardness of the surface layer may be controlled to be soft, and thus development of microcracks may be prevented even when stress acts during plastic processing.

In another implementation embodiment of the present disclosure, the Mn/Si difference may be 0.8 or more, and in another implementation embodiment, the Mn/Si difference may be 0.9 or more or 1.2 or more. Since the larger the Mn/Si difference, the more advantageous it is, there is no need to specifically set an upper limit for the Mn/Si difference. However, when considering a value normally formed, the Mn/Si difference may be set to 1.5 or less.

The above-described Mn/Si difference may be achieved when the average of the Mn/Si values of the surface portion increases. In one implementation embodiment of the present disclosure, the average of the surface portion Mn/Si values of the surface oxides may be limited to 1.5 or more, in another implementation embodiment, the average of the Mn/Si values of the surface portion may be 1.7 or more, and in still another implementation embodiment, the average of the Mn/Si values of the surface portion may be 1.9 or more. Since the greater the Mn/Si values of the surface oxides, the more advantageous it is, the upper limit is not particularly limited, but may be determined to be 2.2 or less.

In addition, as another method of increasing the Mn/Si difference, a method of keeping an average of Mn/Si values of internal oxides low may be used. In one embodiment of the present disclosure, the average of the Mn/Si value of the internal oxide may be 1.0 or less, in another implementation embodiment, the average of the Mn/Si values of the internal oxides may be 0.9 or less, and in still another implementation embodiment, the average of the Mn/Si values of the internal oxides may be 0.8 or less or 0.7 or less. Since the lower the average of the Mn/Si values of the internal oxides, the more advantageous it is, the lower limit is not particularly limited, but may be determined to be 0.4 or more.

In one implementation embodiment of the present disclosure, the Mn/Si difference may use a value obtained at a center of the steel sheet in a width direction. However, it is not necessarily limited to this position, and for example, since spot weldability of the edge portion in the width direction may be a problem in more cases, the value obtained from the edge portion in the width direction may be used. Here, the edge portion in the width direction refers to both end points of a cross section obtained by cutting the steel sheet in the width direction, but when there is a problem with integrity of a specimen, such as the occurrence of contamination at the above points, it may mean a point inside 1 mm in the width direction from the end point.

The type of steel sheet targeted in the present disclosure is not limited as long as it is a high-strength steel sheet having a strength of 780 MPa or more. However, it is not necessarily limited thereto, but the steel sheet targeted in the present disclosure may have a composition containing, by wt %, C: 0.05 to 1.5%, Si: 2.0% or less, Mn: 1.0 to 20%, S—Al (acid-soluble aluminum): 3% or less, Cr: 2.5% or less, Mo: 1% or less, B: 0.005% or less, Nb: 0.2% or less, Ti: 0.2% or less, V: 0.2% or less, Sb+Sn+Bi: 0.1% or less, N: 0.01% or less. The remaining components are iron and other impurities, and do not exclude components containing elements that are not listed above but may be further included in steel in the range of 1.0% or less in total. In the present disclosure, the content of each component element is represented based on weight unless otherwise specified. The above-described composition means the bulk composition of the steel sheet, that is, the composition at a ¼ point of the thickness of the steel sheet (hereinafter, the same).

However, in some implementation examples of the present disclosure, TRIP steel, DP steel, CP steel, and the like may be targeted as the high-strength steel sheet. Each steel may have the following composition.

Steel composition 1: C: 0.05 to 0.30% (preferably 0.10 to 0.25%), Si: 0.5 to 2.5% (preferably 1.0 to 1.8%), Mn: 1.5 to 4.0% (preferably 2.0 to 3.0%), S—Al: 1.0% or less, Cr: 2.0% or less (preferably 1.0% or less), Mo: 0.2% or less (preferably 0.1% or less), B: 0.005% or less (preferably 0.004% or less), Nb: 0.1% or less (preferably 0.05% or less), Ti: 0.1% or less (preferably 0.001 to 0.05%), Sb+Sn+Bi: 0.05% or less, N: 0.01% or less, balance Fe, and unavoidable impurities. In some cases, elements that are not listed above but may be included in the steel may be further included up to 1.0% or less in total.

Although not necessarily limited thereto, the steel having the steel composition 1 may include TRIP steel or XF steel, each of which may have a tensile strength of 900 MPa or more.

Steel composition 2: C: 0.05 to 0.30% (preferably 0.10 to 0.2%), Si: 0.5% or less (preferably 0.3% or less), Mn: 4.0 to 10.0% (preferably 5.0 to 9.0%), S—Al: 0.05% or less (preferably 0.001 to 0.04%), Cr: 2.0% or less (preferably 1.0% or less), Mo: 0.5% or less (preferably 0.1 to 0.35%), B: 0.005% or less (preferably 0.004% or less), Nb: 0.1% or less (preferably 0.05% or less), Ti: 0.15% or less (preferably 0.001 to 0.1%), Sb+Sn+Bi: 0.05% or less, N: 0.01% or less, balance Fe, and unavoidable impurities. In some cases, elements that are not listed above but may be included in the steel may be further included up to 1.0% or less in total.

Although not necessarily limited thereto, the steel having the steel composition 2 may include TRIP steel or XF steel, which may have a tensile strength of 1000 MPa or more.

According to one implementation example of the present disclosure, one or more plating layers may be included on the surface of the steel sheet, and the plating layer may be a zinc-based plating layer including galvanized (GI), zinc-magnesium (ZM), galvannealed (GA), or the like. In the present disclosure, since the oxygen concentration of the surface portion is appropriately controlled as described above, even if the zinc-based plating layer is formed on the surface of the steel sheet, the problem of the liquid metal embrittlement occurring during the spot welding may be inhibited.

When the zinc-based plating layer is a GA layer, the alloying degree may be controlled to 8 to 13%, and preferably 10 to 12%. When the alloying degree is not sufficient, zinc in the galvanized layer may penetrate into microcracks and cause the problems of the liquid metal embrittlement. Conversely, when the alloying degree is too high, problems such as powdering may occur.

In addition, the plating adhesion amount of the zinc-based plating layer may be 30 to 70 g/m$^2$. When the plating adhesion amount is too small, it is difficult to obtain sufficient corrosion resistance. On the other hand, when the plating adhesion amount is too large, the manufacturing costs may increase and the liquid metal embrittlement may occur. Therefore, the plating adhesion weight is controlled to be within the range described above. A more preferable range of the plating adhesion amount may be 40 to 60 g/m$^2$.

Hereinafter, one implementation example of manufacturing the steel sheet of the present disclosure will be described. However, it is necessary to note that the steel sheet of the present disclosure does not necessarily have to be manufactured by the following implementation examples, and the following implementation examples are one preferred method for manufacturing the steel sheet of the present disclosure.

First, a steel slab having the above composition may be reheated, hot-rolled through rough rolling and finish rolling, subjected to run out table (ROT) cooling, and then coiled, to thereby manufacturing a hot-rolled steel sheet. Hot rolling conditions such as the ROT cooling are not particularly limited, but in one implementation example of the present disclosure, the slab reheating temperature, finish rolling start and end temperature, and coiling temperature may be limited as follows.

Slab Reheating Temperature: 950 to 1,300° C.

Slab reheating is performed to secure rollability by heating a material before hot rolling. During the slab reheating, the surface portion of the slab combines with oxygen in the furnace to form oxide scale. When the heating temperature is high enough, the composition of the surface portion of the steel sheet and the internal oxide may be controlled to be within an appropriate range through interaction with the process described later. However, conversely, when the heating temperature is too high, crystal grains grow excessively and the material of the steel sheet may deteriorate, so the slab is reheated in the above-described temperature range.

Finish Rolling Start Temperature: 900 to 1,150° C.

When the finish rolling start temperature is excessively high, the surface hot-rolled scale may be excessively developed and the amount of surface defects caused by the scale of the final product may increase, so the upper limit is limited to 1,150° C. In addition, when the finish rolling start temperature is less than 900° C., the rigidity of a bar increases due to the decrease in temperature, so the hot rolling property may be greatly reduced, to thereby limit the finish rolling start temperature to the above range.

Finish Rolling End Temperature: 850 to 1,050° C.

When the finish rolling end temperature exceeds 1,050° C., the scale removed by descaling during finish rolling is excessively formed on the surface again, increasing the occurrence amount of surface defects, and when the finish rolling end temperature is less than 850° C., the hot rolling property is lowered, so the finish rolling end temperature may be limited to the above range.

Coiling Temperature: 590 to 750° C.

The hot-rolled steel sheet is coiled in the form of a coil and stored, and the coiled steel sheet is subjected to an annealing process. Oxidizing elements included in the surface portion of the steel sheet are removed by this process. When the coiling temperature of the hot-rolled steel sheet is too low, it is difficult to achieve sufficient effect because the coil is slowly cooled at a temperature lower than the temperature required to oxidize and remove these elements. In addition, when the coiling temperature is too high, it may be difficult to secure materials such as the tensile strength of the steel sheet, and the plating quality may deteriorate.

Heating of Edge Portion of Hot-Rolled Coil: Perform at 600 to 800° C. for 5 to 24 Hours In one implementation embodiment of the present disclosure, the edge portion of the hot-rolled coil may be heated to increase the average of the Mn/Si values of the oxides of the surface portion of the edge portion and lower the average of the Mn/Si values of the internal oxides having a depth of 100 nm or more inside the steel sheet. Heating the edge portion of the hot-rolled coil means heating both end portions of the coiled coil in the width direction, and by heating the edge portion, the edge portion is first heated to a temperature suitable for oxidation. That is, the inside of the coiled coil is maintained at a high temperature, but the edge portion is cooled relatively quickly, so the time required to maintain the temperature suitable for the internal oxidation is shorter in the edge portion. Therefore, compared to the center portion in the width direction, the removal of the oxidizing elements in the edge portion is not active. The heating of the edge portion may be used as one method for removing oxidizing elements from an edge portion.

That is, when the heating of the edge portion is performed, unlike the case of cooling after coiling, the edge portion is first heated, and thus the temperature of the edge portion in the width direction is maintained suitable for the internal oxidation, so the thickness of the internal oxide layer of the edge portion increases. To this end, the heating temperature of the edge portion needs to be 600° C. or higher (based on the temperature of the edge portion of the steel sheet). However, when the temperature is too high, since the tensile strength of the steel sheet decreases, and a scale is excessively formed on the edge portion during heating or a porous highly oxidized scale (hematite) is formed, the surface condition after pickling may deteriorate, so the temperature of the edge portion may be 800° C. or lower. In addition, the Mn/Si ratio increases excessively in both the surface portion and the inside, and the difference may not satisfy the value specified in the present disclosure. A more preferable heating temperature of the edge portion is 600 to 750° C. According to one implementation example of the present disclosure, the heating of the edge portion may be performed in a heat treatment furnace.

In addition, in order to solve the unevenness between the average of the Mn/Si values of the oxides of the surface portion between the edge portion in the width direction and the center portion generated during coiling and the average of the Mn/Si values of the internal oxide having a depth of 100 nm or more inside the steel sheet, the heating time of the edge portion needs to be more than 5 hours. However, when the heating time of the edge portion is too long, the tensile strength of the steel sheet decreases, the scale is excessively formed, or rather, the average of the Mn/Si values of the surface portion of the steel sheet of the edge portion and the internal oxide may be excessively high. Therefore, the heating time of the edge portion may be 24 hours or less.

According to one implementation embodiment of the present disclosure, the heating of the edge portion may be performed by a combustion heating method through an air-fuel ratio control. That is, the oxygen fraction in the atmosphere may be changed through the air-fuel ratio control, and the higher the oxygen partial pressure, the higher the Mn/Si ratio of the surface portion of the steel sheet. Although it is not necessarily limited thereto, in one implementation embodiment of the present disclosure, the ratio may be controlled in a nitrogen atmosphere containing 1 to 2% of oxygen may be controlled by controlling the air-fuel ratio. Since those skilled in the art may control the oxygen fraction by controlling the air-fuel ratio without any special difficulty, this will not be separately described.

Pickling Treatment: Perform at a Rolling Speed of 180 to 250 mpm

In order to remove the scale of the hot-rolled steel sheet that has undergone the above-described process, the hot-rolled steel sheet is put in a hydrochloric acid bath and subjected to the pickling treatment. During pickling, the pickling treatment is performed in a hydrochloric acid concentration of the hydrochloric acid bath which is in the range of 10 to 30 vol %, and the pickling running speed is performed at 180 to 250 mpm. When the pickling speed exceeds 250 mpm, the surface scale of the hot-rolled steel sheet may not be completely removed, and when the pickling speed is lower than 180 mpm, the surface portion of the base iron may be corroded by hydrochloric acid, so the pickling treatment is performed at 180 mpm or more.

Cold Rolling Reduction Ratio: 35 to 60%

After pickling, the cold rolling is performed. During cold rolling, the cold reduction ratio is performed in the range of 35 to 60%. When the cold reduction ratio is less than 35%, there is no particular problem, but it may be difficult to sufficiently control a microstructure due to insufficient recrystallization driving force during annealing. When the cold reduction ratio exceeds 60%, it is difficult to have the average of the appropriate Mn/Si values of the oxides of the surface portion after annealing and the average of the Mn/Si values of the internal oxides having a depth of 100 nm or more inside the steel sheet.

After the above-described cold rolling process, a process of annealing the steel sheet may be followed. Even during the annealing process of the steel sheet, since the average of the Mn/Si values of the oxides of the surface portion of the steel sheet and the average of the Mn/Si values of the internal oxides having a depth of 100 nm or more inside the steel sheet may vary greatly, in one implementation embodiment of the present disclosure, the annealing process may be controlled under the condition in which the average of the Mn/Si values of the oxides of the surface portion and the average of the Mn/Si values of the internal oxides to the depth of 100 nm or more in the steel sheet are appropriately controlled. Among those, the running speed and the dew point in the annealing furnace may be controlled under the following conditions.

Running Speed During Annealing: 40 to 130 mpm

In order to secure sufficient productivity, the running speed of the cold-rolled steel sheet needs to be 40 mpm or more. When the running speed is slow, the grain size may excessively grow and the strength may decrease. In addition, even when the running speed is excessively fast, the time maintained at the high temperature is shortened, so that a sufficient amount of austenite and the fraction of martensite and bainite, which are cooling phases based thereon, may be reduced. Therefore, it may be disadvantageous in terms of securing the material, so, in one implementation embodiment of the present disclosure, the upper limit of the running speed may be set to 130 mpm.

Soaking Zone Temperature and Dew Point Control of Annealing Furnace: Controlled in the Range of −10 to 30° C. at 650 to 900° C.

It is advantageous to control the dew point in the soaking zone of the annealing furnace in order to control the Mn/Si ratio of the oxides in the inside and the surface portion to be within an appropriate range. When the dew point is too low, there is a possibility that oxides such as Si or Mn may be formed on the surface due to the surface oxidation rather than the internal oxidation. These oxides adversely affect plating. Therefore, the dew point needs to be controlled to be −10° C. or higher. Conversely, when the dew point is too high, the oxidation of Fe may occur, so the dew point needs to be controlled to be 30° C. or lower. As such, the temperature for controlling the dew point may be 650° C. or higher, which is a temperature at which a sufficient internal oxidation effect appears. However, when the temperature is too high, surface oxides such as Si are formed to prevent oxygen from diffusing into the inside, and austenite is excessively generated during the heating of the soaking zone to lower the carbon diffusion rate, resulting in lower the internal oxidation level, and the soaking zone austenite size grows excessively, resulting in material softening. In addition, since the load of the annealing furnace may be generated to shorten the life of the equipment and increasing the process cost, the temperature for controlling the dew point may be 900° C. or less.

In this case, the dew point may be controlled by introducing moist nitrogen ($N_2+H_2O$) containing water vapor into the annealing furnace.

Hydrogen Concentration in Annealing Furnace (Soaking Zone): 5 to 10 vol %

The atmosphere in the soaking zone of the annealing furnace maintains a reducing atmosphere by adding 5 to 10 vol % hydrogen to nitrogen gas. When the hydrogen concentration in the annealing furnace is less than 5 vol %, the surface oxides are excessively formed due to the decrease in reducing ability, resulting in poor surface quality and plating adhesion and low resistance to LME. When the hydrogen concentration is high, no special problem occurs, but since the cost increases due to the increase in the amount of hydrogen gas used and there is a risk of explosion in the furnace due to the increase in hydrogen concentration, the hydrogen concentration needs to be limited.

Hydrogen Concentration in Quenching Zone: 25 to 80 vol %

A cooling refrigerant in a quenching zone of an annealing furnace usually uses hydrogen and nitrogen, and an appropriate hydrogen concentration should be maintained to secure an appropriate cooling rate and inhibit surface oxidation by a refrigerant during cooling. When the hydrogen concentration is less than 25%, the reducing hydrogen gas concentration is insufficient, and oxidation of oxidizing-friendly elements such as Si occurs on the surface of the steel sheet during cooling to lower the plating wettability, to thereby lower the Mn/Si ratio of the surface portion. In addition, when the hydrogen concentration is low, the cooling capacity is lowered, and it is difficult to secure a phase fraction of a secondary phase for cooling at an appropriate level, resulting in problems in securing the material. When the hydrogen concentration exceeds 80%, there is a risk of increasing the cost of hydrogen production, and the risk of hydrogen explosion increases during high-water operation, so the upper limit is limited to 80%. In one implementation embodiment of the present disclosure, the cooling rate of the quenching zone may be set to 5 to 30° C./s, and in another implementation embodiment, the cooling rate of the quenching zone may be set to 10 to 30° C./s.

The steel sheet annealed by this process is immediately immersed in a plating bath and subjected to hot-dip galvanizing.

The hot-dip galvanized steel sheet plated by the above process may then undergo the alloying heat treatment process, if necessary. Preferred conditions for the alloying heat treatment are as follows.

Lead in Temperature of Plating Bath Steel Sheet: 420 to 500° C.

When the lead in temperature of the steel sheet in the plating bath is low, the wettability in the contact interface between the steel sheet and liquid zinc is not sufficiently secured, so it needs to be kept above 420° C. There is a problem in that, when the lead in temperature is excessively high, the reaction between the steel sheet and the liquid zinc is excessive, and thus a zeta phase, which is an Fe—Zn alloy phase occurs at the interface, resulting in lowering the adhesion of the plating layer, and dross occurs in the plating bath due to excessive elution of steel sheet Fe element in the plating bath.

The Al concentration in the plating bath needs to be maintained at an appropriate concentration to secure the wettability of the plating layer and the fluidity of the plating bath. In the case of GA, it needs to be controlled 0.10 to 0.15%, and in the case of GI, it needs to be 0.2 to 0.25%, in the case of ZM, Al needs to be controlled to be 0.7 to 5.7 wt % and Mg needs to be controlled to be 0.7 to 5.7 wt % so that the formation of dross in the plating bath may be maintained at an appropriate level, and the surface quality of plating and performance may be secured. In the present disclosure, the plating adhesion amount is not particularly limited and may be appropriately controlled according to the quality required by a customer.

Alloying (GA) Temperature: 480 to 560° C.

When the alloying temperature is less than 480° C., the alloying degree is insufficient due to the small amount of Fe diffusion, which may lead to poor plating properties. When the alloying temperature exceeds 560° C., a powdering problem may occur due to excessive alloying, and the material may be deteriorated due to ferrite transformation of retained austenite, so the alloying temperature is set within the above-described range.

Hereinafter, the present disclosure will be described in more detail with reference to Examples. However, it should be noted that the following Examples are only for illustrating the present disclosure in more detail and are not intended to limit the scope of the present disclosure. This is because the scope of the present disclosure is determined by the matters described in the claims and the matters reasonably inferred therefrom.

Reduction Ratio During Skin Pass: 0 to 0.35

After the hot-dip galvanizing or alloying, skin pass rolling (SPM) is performed to adjust the yield strength and surface roughness of the steel sheet. When the skin pass rolling is performed, the yield strength increases in proportion to the reduction ratio due to the processing hardening by the cold rolling, and the surface roughness of the skin pass rolling roll is transferred to the steel sheet, so the surface roughness increases. Therefore, when the skin pass rolling is performed, by securing the appropriate yield strength and surface roughness through the adjustment of the reduction ratio, it is possible to secure the sealer adhesion by securing the stability of the tensile material and increasing the surface roughness, and it is possible not to perform the skin pass rolling when there is no need to adjust the yield strength and surface roughness after the hot-dip plating. When the reduction ratio exceeds 0.35, the yield strength may excessively increase and may exceed the target material, and the surface roughness may excessively increase, resulting in poor degreasing property due to the capillary phenomenon after oiling caused by the roughness.

MODE FOR INVENTION

A steel slab (the remaining components not listed in the table are Fe and unavoidably included impurities. In addition, in the table, B and N are expressed in ppm units, and the remaining components are expressed in weight % units) having a composition shown in Table 1 below was reheated to 1,210° C., and hot-rolled by setting a finish rolling start temperature and a finish rolling end temperature to 945° C. and 870° C., respectively. Next, an edge portion of the hot-rolled coil was heated in a nitrogen atmosphere containing 1.5 vol % or less of oxygen and then pickled in a hydrochloric acid bath with a hydrochloric acid concentration of 12.3 vol %, and cold-rolled at a reduction ratio of 53%. Then, as soon as the obtained cold-rolled steel sheet was heated in a soaking zone in an annealing furnace and then rapidly cooled (cooling rate: 15° C./s) in an atmosphere of hydrogen concentration of 60 vol %-remaining nitrogen atmosphere, GA was immersed in a plating bath containing 0.13% of Al, and GI was immersed in a plating bath containing 0.24 wt % of Al, ZM was immersed in a zinc-based plating bath containing 1.75 wt % of Al and 1.55 wt % of Mg, and then the hot-dip galvanizing was performed by adjusting the adhesion amount through air knife and cooling. In the case of the GA, alloyed (GA) heat treatment was performed on the obtained hot-dip galvanized steel sheet within a preferred range of 480 to 560° C., if necessary, to finally obtain an alloyed hot-dip galvanized steel sheet. Skin pass rolling was performed on the obtained hot-dip galvanized steel sheet or alloyed hot-dip galvanized steel sheet at a reduction ratio of 8%.

In all examples, the lead in temperature of the steel sheet drawn into the hot-dip galvanizing bath was set to be 475° C. Other conditions for each Example were as described in Table 2.

TABLE 1

| Steel type | C | Si | Mn | S—Al | Cr | Mo | B | Nb | Ti | Sb | Sn | Bi |
|---|---|---|---|---|---|---|---|---|---|---|---|---|
| A | 0.171 | 3.54 | 2.27 | 0.0012 | 0.145 | 0.041 | 9 | 0.041 | 0.027 | 0 | 0 | 0.009 |
| B | 0.204 | 1.542 | 2.32 | 0.0017 | 0 | 0 | 7 | 0 | 0.018 | 0 | 0.012 | 0 |
| C | 0.121 | 1.009 | 24.45 | 0.0012 | 0 | 0 | 0 | 0 | 0.014 | 0 | 0 | 0 |
| D | 0.172 | 1.485 | 2.08 | 0.0014 | 0.124 | 0 | 9 | 0.021 | 0.014 | 0.021 | 0 | 0 |
| E | 0.184 | 1.121 | 2.234 | 0.0012 | 0.14 | 0.012 | 5 | 0.013 | 0.027 | 0.014 | 0 | 0 |
| F | 0.173 | 1.497 | 2.57 | 0.0012 | 0 | 0 | 11 | 0.014 | 0.021 | 0.017 | 0 | 0 |
| G | 0.214 | 3.014 | 2.412 | 0.0014 | 0 | 0 | 14 | 0.021 | 0.019 | 0 | 0 | 0 |

TABLE 2

| Steel type | Division | Hot-rolled coiling temperature (° C.) | Heating temperature of heat treatment furnace for heating edge portion by (° C.) | Heating time of heat treatment furnace for heating edge portion (hr) | Pickling speed (mpm) | Running speed of annealing furnace (mpm) | Soaking zone temperature (° C.) | Dew point of 650 to 900° C. (° C.) | Hydrogen concentration in annealing furnace (Vol %) |
|---|---|---|---|---|---|---|---|---|---|
| B | Comparative Example 1 | 706 | 698 | 10 | 145 | 79 | 821 | 8 | 5 |
| B | Inventive Example 1 | 621 | 631 | 15 | 214 | 86 | 793 | −5 | 6 |
| B | Comparative Example 2 | 504 | 654 | 19 | 214 | 87 | 804 | 17 | 7 |
| D | Inventive Example 2 | 630 | 624 | 12 | 212 | 101 | 811 | 10 | 6 |
| B | Comparative Example 3 | 621 | 612 | 12 | 189 | 109 | 817 | 14 | 2 |
| F | Inventive Example 3 | 624 | 708 | 10 | 210 | 75 | 824 | 17 | 5 |
| F | Inventive Example 4 | 611 | 652 | 14 | 209 | 75 | 795 | 9 | 6 |
| D | Comparative Example 4 | 624 | 624 | 12 | 214 | 151 | 817 | 11 | 5 |
| E | Comparative Example 5 | 714 | 624 | 3 | 214 | 76 | 811 | 7 | 7 |
| D | Comparative Example 6 | 614 | 635 | 11 | 208 | 114 | 795 | −21 | 6 |
| E | Inventive Example 5 | 617 | 741 | 12 | 211 | 45 | 842 | 10 | 5 |
| D | Comparative Example 7 | 852 | 625 | 11 | 210 | 84 | 831 | 11 | 8 |
| E | Comparative Example 8 | 719 | 575 | 7 | 232 | 79 | 812 | 9 | 8 |
| C | Comparative Example 9 | 617 | 634 | 15 | 195 | 89 | 896 | 12 | 7 |
| D | Comparative Example 10 | 619 | 678 | 10 | 241 | 87 | 912 | 21 | 6 |
| E | Inventive Example 6 | 632 | 710 | 10 | 214 | 65 | 810 | 14 | 5 |
| E | Inventive Example 7 | 607 | 714 | 12 | 214 | 74 | 811 | 8 | 6 |
| B | Comparative Example 11 | 617 | 635 | 11 | 223 | 27 | 832 | 15 | 5 |
| E | Comparative Example 12 | 624 | 624 | 12 | 231 | 94 | 642 | 21 | 6 |
| B | Comparative Example 13 | 704 | 741 | 26 | 217 | 74 | 807 | 5 | 7 |
| B | Inventive Example 8 | 594 | 650 | 17 | 201 | 78 | 854 | 17 | 5 |
| F | Comparative Example 14 | 705 | 611 | 11 | 267 | 75 | 812 | 6 | 7 |
| D | Inventive Example 9 | 602 | 720 | 12 | 214 | 76 | 795 | 12 | 5 |
| F | Comparative Example 15 | 721 | 821 | 10 | 225 | 76 | 817 | 10 | 8 |
| A | Comparative Example 16 | 621 | 648 | 10 | 214 | 121 | 809 | 11 | 7 |
| G | Comparative Example 17 | 625 | 647 | 17 | 206 | 96 | 798 | 14 | 7 |
| B | Inventive Example 10 | 632 | 724 | 11 | 185 | 76 | 817 | 11 | 5 |

TABLE 2-continued

| Steel type | Division | Hot-rolled coiling temperature (° C.) | Heating temperature of heat treatment furnace for heating edge portion (° C.) | Heating time of heat treatment furnace for heating edge portion (hr) | Pickling speed (mpm) | Running speed of annealing furnace (mpm) | Soaking zone temperature (° C.) | Dew point of 650 to 900° C. (° C.) | Hydrogen concentration in annealing furnace (Vol %) |
|---|---|---|---|---|---|---|---|---|---|
| F | Comparative Example 18 | 651 | 613 | 10 | 214 | 105 | 842 | 41 | 6 |

The characteristics of the hot-dip galvanized steel sheet manufactured by the above-described process were measured, and the results of observing whether or not liquid metal embrittlement (LME) occurred during spot welding were shown in Table 3. The test results shown in Table 3 were all measured using samples taken at a point 1 mm away from the edge portion of the steel sheet unless the position is specifically mentioned. When the size of the sample was large, a sample with a predetermined dimension was measured with the point 1 mm away from the edge portion as a starting point. Specifically, the spot welding was performed by cutting the steel sheet in a width direction along each cut edge. A spot welding current was applied twice and a hold time of 1 cycle was maintained after a current was applied. The spot welding was performed in dissimilar 3 sheets. Evaluation material-evaluation material-GA 980DP 1.4t material were stacked in order and subjected to the spot welding. After a new electrode was welded to a soft material 15 times during the spot welding, the electrode was worn, and then the upper limit current at which expulsion occurred with the spot welding target material was measured. After measuring the upper limit current, the spot welding was performed 8 times for each welding current at a current lower than the upper limit current by 0.5 and 1.0 kA, and a cross section of the spot welded portion was precisely processed by electric discharge machining, and epoxy mounted and polished, and a length of cracks was measured with an optical microscope. When observing with the optical microscope, the magnification was set to 100, and when no cracks were found at that magnification, it was determined that the liquid metal embrittlement had not occurred, and when cracks were found, the length was measured with image analysis software. B-type cracks occurring at a shoulder portion of the spot welded portion were determined to be 100 μm or less and C-type cracks were determined to be good when not observed.

The average weight ratio of Mn/Si between surface oxides on a steel sheet and internal oxides having a depth of 100 nm or more inside the steel sheet was processed by a focused ion beam (FIB), and the oxides present on the surface portion of the steel sheet and oxides having a depth of 50 to 100 nm inside the steel sheet were analyzed at least 10 times at each position by EDS of TEM, and the wt % value of Mn and Si at each position measured by a weight ratio was measured as an average of the results calculated as Mn/Si.

Tensile strength was measured through a tensile test by making a C-direction sample of the JIS-5 standard. The alloying degree and the plating adhesion amount were measured using a wet dissolution method using a hydrochloric acid solution.

For sealer adhesion, an automotive structural adhesive D-type was bonded to a plating surface and then the steel sheet was bent at 90° to check whether the plating was removed. The GI and ZM steel sheets were subjected to a sealer adhesion test.

For powdering, after bending the plating material at 90°, the tape was adhered to the bent area and then removed to confirm how many mm the plating layer was removed from the tape. When the length of the plating layer peeled off from the tape exceeded 10 mm, it was confirmed as defective.

After flaking was processed in a 'U' shape, it was checked whether the plating layer was removed from the processed part. The surface quality was confirmed by visually checking whether there were any defects such as the unplating of the steel sheet, and when defects such as the unplating were observed with the naked eye, the steel sheet was determined to be defective.

TABLE 3

| Division | Oxide Mn/Si on surface portion | Internal oxide Mn/Si | Tensile strength (Mpa) | Type of plating | Plating adhesion amount (g/m2) | Surface quality | Powdering (mm) | Peeling or not (Flaking) | Sealer adhesion | B-type crack length (μm) | C-type crack length (μm) |
|---|---|---|---|---|---|---|---|---|---|---|---|
| Comparative Example 1 | 0.7 | No oxide | 1,184 | GA | 46 | Good | 4 | Peeling | — | 24 | 112 |
| Inventive Example 1 | 1.7 | 0.3 | 1,241 | GA | 49 | Good | 4 | Good | — | 45 | ND |
| Comparative Example 2 | 0.8 | 1.4 | 1,187 | GA | 42 | Good | 1 | Good | — | 21 | 321 |
| Inventive Example 2 | 1.6 | 1.4 | 1,045 | GA | 45 | Good | 2 | Good | — | ND | ND |
| Comparative Example 3 | 0.4 | 1.12 | 1,196 | GI | 12 | Bad | — | — | Peeling | ND | 452 |
| Inventive Example 3 | 1.65 | 0.45 | 1,034 | ZM | 59 | Good | 2 | — | Good | ND | ND |
| Inventive Example 4 | 1.72 | 0.45 | 978 | GA | 48 | Good | 1 | Good | — | 65 | ND |
| Comparative Example 4 | 0.45 | No oxide | 784 | GI | 57 | Bad | — | — | Good | 45 | 166 |

TABLE 3-continued

| Division | Oxide Mn/Si on surface portion | Internal oxide Mn/Si | Tensile strength (Mpa) | Type of plating | Plating adhesion amount (g/m2) | Surface quality | Powdering (mm) | Peeling or not (Flaking) | Sealer adhesion | B-type crack length (μm) | C-type crack length (μm) |
|---|---|---|---|---|---|---|---|---|---|---|---|
| Comparative Example 5 | 0.56 | 1.02 | 1,014 | GA | 47 | Good | 2 | Good | — | 96 | 141 |
| Comparative Example 6 | 0.65 | 1.01 | 1,025 | GI | 46 | Bad | — | — | Peeling | 24 | 245 |
| Inventive Example 5 | 1.63 | 0.45 | 1,027 | GA | 42 | Good | 4 | Good | — | 23 | ND |
| Comparative Example 7 | 1.85 | 0.54 | 754 | GA | 43 | Bad | 11 | Peeling | — | ND | ND |
| Comparative Example 8 | 1.02 | 1.03 | 995 | GA | 44 | Good | 2 | Good | — | 65 | 548 |
| Comparative Example 9 | 0.87 | No oxide | 987 | GI | 57 | Bad | — | — | Peeling | 95 | 521 |
| Comparative Example 10 | 0.74 | 1.01 | 754 | GA | 47 | Good | 1 | Good | — | 36 | 245 |
| Inventive Example 6 | 1.65 | 0.56 | 1,021 | GA | 43 | Good | 1 | Good | — | 14 | ND |
| Inventive Example 7 | 1.71 | 0.75 | 1,029 | GA | 41 | Good | 0 | Good | — | ND | ND |
| Comparative Example 11 | 1.82 | 0.41 | 788 | GA | 49 | Good | 12 | Good | — | 35 | ND |
| Comparative Example 12 | 0.54 | No oxide | 742 | GA | 46 | Good | 0 | Good | — | 45 | 287 |
| Comparative Example 13 | 3.12 | 2.84 | 745 | GA | 46 | Bad | 12 | Good | — | 75 | 135 |
| Inventive Example 8 | 1.54 | 0.54 | 1,242 | GA | 47 | Good | 2 | Good | — | ND | ND |
| Comparative Example 14 | 1.74 | 0.25 | 984 | GA | 48 | Bad | 13 | Good | — | 15 | ND |
| Inventive Example 9 | 1.81 | 0.65 | 1,174 | GA | 42 | Good | 0 | Good | — | 45 | ND |
| Comparative Example 15 | 3.32 | 3.01 | 741 | GA | 48 | Bad | 13 | Good | — | 54 | 203 |
| Comparative Example 16 | 0.65 | No oxide | 1,241 | GI | 56 | Bad | — | — | Peeling | 52 | 245 |
| Comparative Example 17 | 0.73 | No oxide | 1,241 | ZM | 56 | Bad | — | — | Peeling | 15 | 745 |
| Inventive Example 10 | 1.78 | 0.57 | 1,212 | GI | 42 | Good | 5 | Good | — | 14 | ND |
| Comparative Example 18 | 2.04 | 0.45 | 774 | GI | 47 | Bad | — | — | Peeling | 54 | 45 |

Inventive examples 1, 2, 3, 4, 5, 6, 7, 8, 9, and 10 satisfied the range suggested in the present disclosure for steel composition, and the manufacturing method also satisfied the range of the present disclosure, so the tensile strength, the plating quality, the plating adhesion amount, and the spot welding LME crack length were also good.

In Comparative Examples 9, 16, and 17, even though the manufacturing method satisfies the range suggested by the present disclosure, the steel component exceeded the range suggested by the present disclosure. In Comparative Examples 5, 13, and 20, Mn and Si exceeded the range suggested by the present disclosure, respectively, and even when the dew point was raised in the annealing furnace, the surface oxidation amount of the surface portion was excessive, so the average of the Mn/Si values of the surface oxides on steel sheet was out of the reference, and the average weight ratio of the Mn/Si values for the internal oxides was out of the reference, so the LME crack length did not satisfy the reference. In addition, due to the excessive surface oxides, the alloying inhibition layer was not sufficiently formed at the interface between the plating layer and the base iron, so the unplated surface occurred, resulting in poor surface quality and poor plating adhesion due to SBT peeling.

In Comparative Examples 2 and 7, the coiling temperature during the hot rolling process did not satisfy the range suggested by the present disclosure. Comparative Example 2 is a case where the hot-rolled coiling temperature was lower than the range suggested by the present disclosure. Due to this, the average of the Mn/Si values of the surface oxides on steel sheet was out of the reference, and the average weight ratio of the Mn/Si values for the internal oxides was out of the reference, so the LME cracks did not satisfy the reference. Comparative Example 7 is a case where the hot-rolled coiling temperature suggested by the present disclosure was exceeded. Although the LME properties were good, the hot-rolled scale was excessively generated, so the scale was not completely removed during pickling, and unplating occurred, resulting in poor surface quality. As a result, the plating peeling occurred during flaking evaluation, and powdering property was poor due to the uneven alloying. In addition, since the hot-rolled coiling temperature was excessively high, the softening of the hot-rolled material occurred and did not recover even after annealing, resulting in insufficient tensile strength.

In Comparative Example 15, since the heating temperature of the heat treatment furnace exceeded the range suggested in the present disclosure, peroxidation occurred at the edge portion during the heat treatment process, so the surface scale formed red hematite and the thickness was excessively deep. In the pickling process after the hot rolling, the edge portion was excessively pickled, so the surface roughness increases, resulting in uneven surface shape and color unevenness defects, which were different from the central portion, after the plating, and poor powdering properties due to the uneven alloying. In addition, the average weight ratio of Mn/Si values increased in both the surface portion and the inside, and the difference between the two values was less than 0.5, so the LME standard was not satisfied.

Comparative Example 8 is a case where the heating temperature of the heat treatment furnace for heating the edge portion was lower than the range specified in the present disclosure. As a result, the Mn/Si ratio of the surface portion and the internal oxide could not be controlled, so the reference for spot welding LME crack evaluation was not satisfied, resulting in poor results.

Comparative Example 13 is a case where the heating temperature of the heat treatment furnace for heating the edge portion satisfies the range of the present disclosure, but the heating time was exceeded. As a result, peroxidation occurred on the edge portion during the heat treatment process, and the surface scale formed red hematite, and the thickness thereof was excessively deep. In the pickling process after the hot rolling, the edge portion was excessively pickled, so the surface roughness increases, resulting in uneven surface shape and color unevenness defects, which were different from the central portion, after the plating, and poor powdering properties due to the uneven alloying. In addition, the Mn/Si ratio increased in both the surface portion and the inside, and the difference was less than 0.5, resulting in poor weldability.

Comparative Example 5 is a case where the heating temperature of the heat treatment furnace satisfies the range of the present disclosure, but the heating time of the heat treatment furnace was short. As a result, the oxide composition was not controlled to be within the range stipulated by the present disclosure, and therefore, did not satisfy the reference during the spot welding LME crack evaluation.

In Comparative Examples 1 and 14, the pickling speed did not satisfy the range suggested by the present disclosure. In Comparative Example 1, as the pickling speed was set to be lower than the standard and thus became excessively long, the surface portion was deeply dissolved and removed, so the average of the Mn/Si values of the surface oxides on the steel sheet was out of the reference and the average weight ratio of the Mn/Si values of the internal oxides was also out of the reference, to thereby generate LME cracks. As the internal oxide grain boundary of hot rolling was corroded by the acid solution, the robustness of the grain boundary deteriorated and the peeling occurred during the flaking test. In Comparative Example 14, the pickling speed was set to be higher than the reference, so the hot-rolled scale present on the surface of the steel sheet was not completely removed, resulting in poor surface quality and poor powdering property due to the uneven GA alloying.

Comparative Example 10 is a case where the soaking zone temperature in the annealing furnace exceeded the range suggested by the present disclosure. As the annealing temperature becomes excessive, the external oxidation amount increased and the sufficient internal oxidation amount were not be formed, and thus, the average of the Mn/Si values of the surface oxides on steel sheet was out of the reference and the average weight ratio of the Mn/Si values for the internal oxides was also out of the reference, so the LME cracks did not satisfy the reference, resulting in poor spot weldability. In addition, austenite was excessively formed and grown in the soaking zone, and the material did not satisfy the criterion, resulting in poor results.

Comparative Example 12 is a case where the soaking zone temperature in the annealing furnace was lower than the range suggested by the present disclosure. As the annealing temperature was low, the oxidation reaction between water vapor and a steel sheet was not sufficient, and thus, the average of the Mn/Si values of the surface oxides on steel sheet was out of the reference and the average weight ratio of the Mn/Si values of the internal oxides was also out of the reference, so the LME cracks did not satisfy the reference, resulting in poor spot weldability. In addition, since recrystallization was not sufficiently performed during annealing, a targeted microstructure was not formed, and the material did not satisfy the criterion, resulting in poor results.

In Comparative Example 6, the dew point in the furnace during annealing was set to be lower than the range suggested by the present disclosure. Even if a sufficient internal oxide layer was generated for the entire width during the hot rolling heating process, the dew point was not sufficiently high during the annealing process after cold rolling, and thus, the average of the Mn/Si values of the surface oxides on the steel sheet was out of the reference and the average weight ratio of the Mn/Si values of the internal oxides was also out of the reference, so the spot welding LME crack length did not satisfy the reference. The GI material did not generate sufficient internal oxidation due to the low dew point, so the surface oxides were excessively generated, resulting in poor surface quality and SBT peeling.

Comparative Example 18 is a case where the dew point range in the annealing furnace exceeded the range suggested by the present disclosure. Although the spot weldability was excellent as the dew point was excessively high, the material deteriorated due to the excessive internal oxidation and the generation amount of surface oxides also increased due to the excessive dew point.

In Comparative Example 3, the hydrogen concentration in the annealing furnace was less than 5 vol %, and the composition of the reducing atmosphere in the annealing furnace was insufficient. The unplating occurred due to the excessive surface oxide formation, so the surface quality deteriorated and the SBT plating peeling occurred, and the oxide composition cannot be controlled, so that the LME cracks did not the reference.

In Comparative Examples 4 and 11, the running speed in the annealing furnace was out of the range suggested by the present disclosure. Comparative Example 4 is a case where the running speed was higher than the range suggested by the present disclosure, and the oxide composition was not controlled to be within the range specified in the present disclosure, so sufficient recrystallization time was not secured in the annealing furnace, resulting in poor material. Comparative Example 11 is a case where the running speed was lower than the range suggested by the present disclosure, and the spot weldability was good by satisfying the oxide composition condition, but the excessive oxide was formed on the surface, so the surface quality of the plating steel sheet was insufficient and the powdering occurred.

Therefore, it was possible to confirm the advantageous effect of the present disclosure.

The invention claimed is:

1. A hot-dip galvanized steel sheet, comprising:
a base steel sheet; and
a hot-dip galvanized layer formed on a surface of the base steel sheet,
wherein a difference between an average of Mn/Si values of surface oxides present on a surface portion, which is a region from an interface between the hot-dip galvanized layer and the base steel sheet to a depth of 15 nm, and an average of Mn/Si values of internal oxides, which are present in the region from the interface to the depth of 50 to 100 nm, is 0.5 or more, and Mn and Si of each oxide mean amounts (wt %) of Mn and Si components in the oxide, which are measured by EDS, and the average of the Mn/Si values means an averaged value of the Mn/Si values measured for each oxide.

2. The hot-dip galvanized steel sheet of claim 1, wherein the difference in the average is 0.8 or more.

3. The hot-dip galvanized steel sheet of claim 1, wherein the average of the Mn/Si values of the surface oxides is 1.5 or more.

4. The hot-dip galvanized steel sheet of claim 1, wherein the average of the Mn/Si values of the surface oxides is 1.7 or more.

5. The hot-dip galvanized steel sheet of claim 1, wherein the average of the Mn/Si values of the internal oxides is 1.0 or less.

6. The hot-dip galvanized steel sheet of claim 1, wherein the average of the Mn/Si values of the internal oxides is 0.9 or less.

7. The hot-dip galvanized steel sheet of claim 1, wherein the base steel sheet has a composition containing C: 0.05 to 1.5%, Si: 2.0% or less, Mn: 1.0 to 20%, S-Al (acid-soluble aluminum): 3% or less, Cr: 2.5% or less, Mo: 1% or less, B: 0.005% or less, Nb: 0.2% or less, Ti: 0.2% or less, V: 0.2% or less, Sb+Sn+Bi: 0.1% or less, N: 0.01% or less.

\* \* \* \* \*